July 8, 1958 C. E. LOMAX 2,842,619

ELEVEN LEVEL DROP-BACK SELECTOR

Filed June 21, 1955 2 Sheets-Sheet 1

*INVENTOR.*
CLARENCE E. LOMAX

*BY* [signature]

ATTY.

ELEVEN LEVEL DROP-BACK SELECTOR

Filed June 21, 1955 2 Sheets-Sheet 2

INVENTOR.
CLARENCE E. LOMAX
BY [signature]
ATTY.

United States Patent Office 2,842,619
Patented July 8, 1958

2,842,619

ELEVEN LEVEL DROP-BACK SELECTOR

Clarence E. Lomax, Chicago, Ill., assignor to General Telephone Laboratories, Incorporated, a corporation of Delaware Application June 21, 1955, Serial No. 516,968

8 Claims. (Cl. 179—18)

The present invention relates to automatic telephone systems in general, but is more particularly concerned with systems employing group selector switches of the well known two-motion type.

In the well known automatic switches of the aforementioned type, ten levels are usually provided. Each level has access to a separate group of trunks. Ordinarily, after such a switch has been set on the desired level, it hunts for an idle trunk therein, and in case all trunks in this level are found busy, the calling party receives a busy tone.

The chief object of the invention is to provide means for increasing the number of trunks in a group to such an extent that is beyond the capacity that can be accommodated in one level.

According to a feature of this invention, the selector switch is provided with a normal level or an eleventh level, to which additional trunks of the group or groups accommodated in one or more regular levels are connected, and when all the trunks connected to the particular regular level or levels are found busy, the selector switch is caused automatically to be released by drop-back action and then select a trunk in the normal level.

A further feature of this invention is to provide a circuit arrangement wherein the transmission of busy tone is withheld at the time all trunks of the predetermined regular level or levels have been found busy, and wherein busy tone is returned to the calling line only in the event all trunks of the predetermined regular level or levels as well as those of the normal level have been found busy.

A need for an arrangement of the above kind may arise, for example, in special third selectors, which are often used to give access to toll trunks, information trunks and the like. If the number of calls to one of these services, say, to toll, is higher as compared to those of the other services, the above arrangement, according to the invention, makes it unnecessary to split the toll trunks up into a plurality of groups.

The above and other features of the invention will be apparent from the following description when taken in connection with the accompanying drawings in which.

Figure 1:
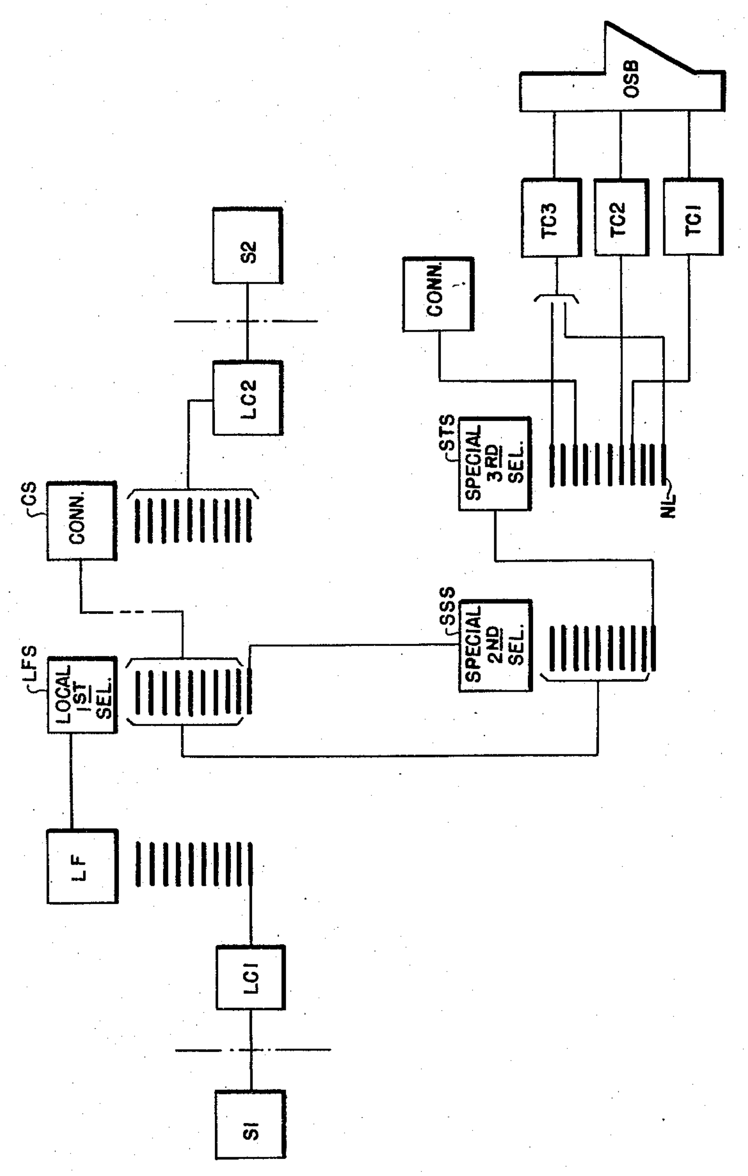
Fig. 1 is a schematic trunking diagram of a telephone system incorporating a normal-level switch according to the invention as a special third selector.

Referring now more particularly to Fig. 1 of the drawings, there is illustrated an automatic telephone system comprising substations S1 and S2 with their associated line circuits LC1 and LC2 respectively, and a local switch train including line finders LF, local first selectors LFS and connectors CS. A switch train of this kind has been described in U. S. Patent 2,490,221 issued to C. E. Lomax, to which reference is made for details of operation. Further switches such as local second selectors may be included in the switch train as indicated by the broken line in Fig. 1.

As shown in Fig. 1, a group of special second selectors SSS is connected to the first level of the local first selectors LFS, and a group of special third selectors STS is connected to the first level of special second selectors SSS. Each selector is of the two motion type having ten bank levels with the exception of the special third selectors STS, each of which, in addition, is provided with a normal level. As indicated in Fig. 1, the bank contacts in levels 2–10 of the local first selectors LFS and special second selectors SSS are multiplied together in the well-known manner in order to assure proper operation on local calls even in case of receipt of an accidental preliminary impulse by the local first selector over the calling subscriber's line. Levels 3, 4 and 10 of special third selectors STS give access to three different groups, designated at TC1, TC2, and TC3 of special service trunks. Each of these trunk circuits, in turn, is connected to an operator's switch board OSB. Trunk circuits TC1, for example, may terminate information service trunks; trunk circuits TC2 terminate repair service trunks and trunk circuits TC3 terminate toll service trunks. These trunk circuits may be of any well known type and may be similar, for example, to the trunk circuits as shown in Fig. 5 of my copending application S. N. 215,561, filed March 14, 1951. As indicated in Fig. 1, the groups of toll trunks with which the embodiment described hereinafter is particularly concerned, include both trunks connected to the tenth level and trunks connected to the normal level NL of the special third selectors.

Figure 2:
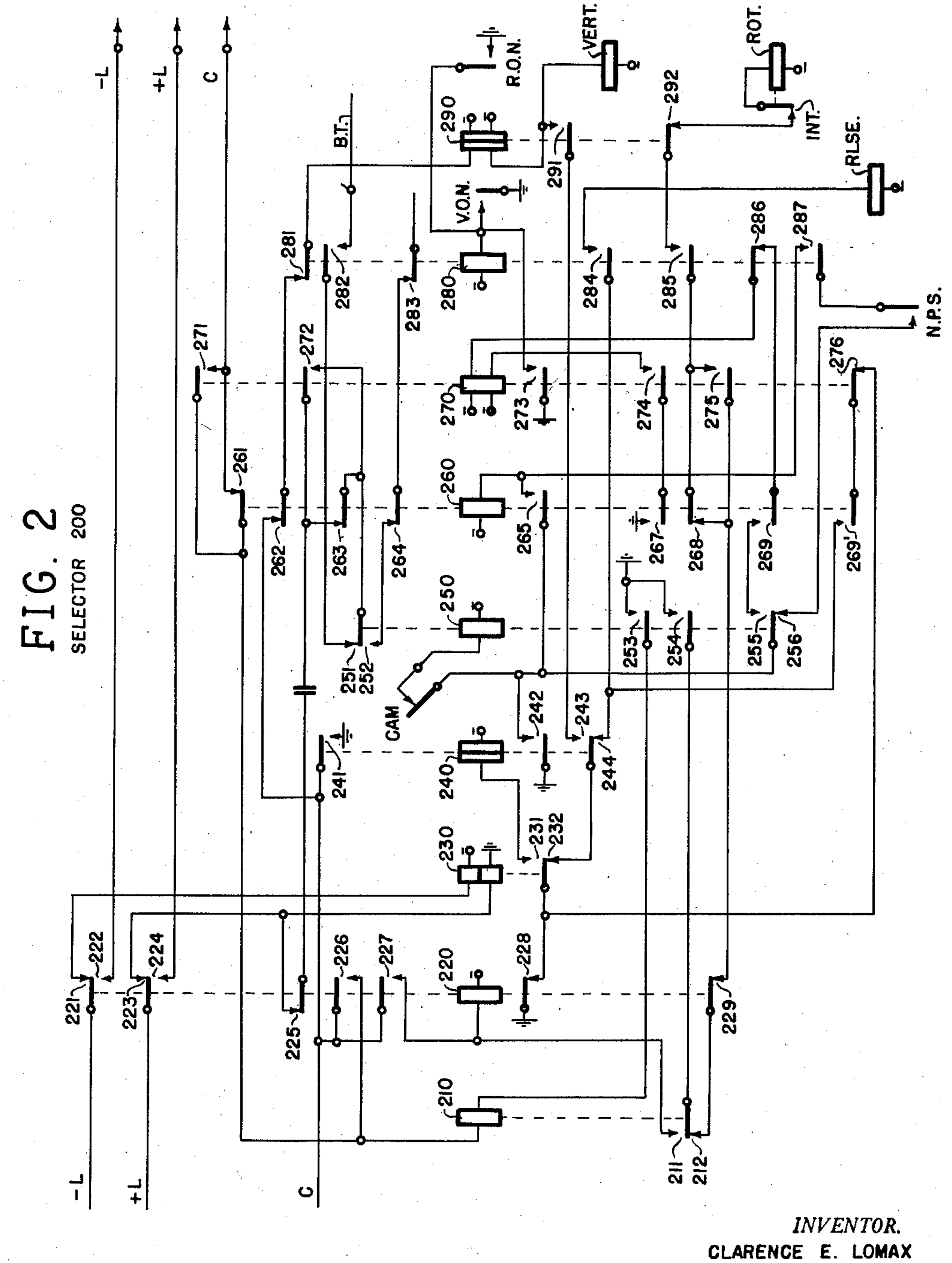
Fig. 2 shows the detailed circuit diagram of a normal level drop-back selector switch according to the invention.

As indicated in Fig. 2, the selector 200 is provided with normal post springs N. P. S. which determine on which levels the shaft shall release to hunt over the normal level. These springs N. P. S. can be made to operate on different levels if desired. There may be conditions under which the overflow trunks are needed for different levels other than toll. For instance the overflow trunks may be needed for information trunks, in which case the normal post springs N. P. S. will operate on the third level and the trunks in the normal level will be information trunks.

While it has been assumed herein that these selector switches, as shown in Fig. 1 are of the well known Strowger type, it should be understood that two-motion switches of other construction could also be used in carrying out the present invention.

After having thus described the apparatus involved in the instant embodiment, the operation of the telephone system in extending a connection from substation S1 to the operator's switch board will now be described in detail. Upon lifting the telephone handset, the subscriber at substation S1 is connected, by way of the subscriber line, line circuit LC1, and a line finder LF to a local first selector LFS in a well known manner. The subscriber subsequently dials the digit 1 to cause his first selector to select one of the special second selectors SSS and then again dials 1 to cause the last mentioned selector to select one of the special third selectors, for example, the special third selector 200, as shown in Fig. 2.

Referring now to Fig. 2, the seizure of the special third selector 200 results in the energization of the upper winding of the change over relay 290 over the following path: ground on the incoming conductor C, contacts 262, contacts 281, upper winding of relay 290 to battery. Upon switching through of the preceding switch, the line relay 230 is operated in the well known manner via contacts 221 and 223 through negative and positive incoming conductors —L and +L respectively. Relay 230, in closing contacts 231, operates the holding relay 240 and thereby causes the direct ground potential to be placed via contacts 241 on the incoming conductor C in order to hold the preceding switch. Relay 240, in closing contacts 242 completes an obvious circuit to operate relay 250 via cam spring CAM; in closing contacts 243 prepares a circuit to the lower winding of relay 290 and the vertical magnet via contacts 291. Relay 250 upon operation, at contacts 251 opens a point in the busy tone circuit under certain conditions, which will be dealt with in a later paragraph. Relay 250, in closing contacts 253, closes a point in the circuit for testing relay 210 and prepares to operate said relay when and if an idle trunk is found and seized over the following path: ground, contacts 253, relay 210, contacts 261, outgoing conductor C through the upper winding of the changeover relay of the succeeding switch to battery. Also, relay 250, in closing contacts 254 prepares a circuit to the rotary magnet and further prepares to close another circuit to the switch-through relay 220 by way of contacts 254, contacts 211, through its winding of relay 220 to battery. Furthermore, relay 250, in closing contacts 255, prepares a circuit to energize the upper winding of relay 270; in opening contacts 256 interrupts a point to the circuit for operating relay 260.

The special third selector 200 is now conditioned to be responsive to the digit dialed at the calling subscriber substation S1. When the subscriber at the calling subscribers substation S1 dials a certain digit, the line relay 230 in the selector 200 follows the impulses thereof. Each time the line relay 230 restores and then reoperates, it interrupts and then recompletes, at the contacts 231, the previous traced circuit for maintaining operated the hold relay 240, which remains operated during the digit by virtue of its slow characteristics. It further completes and then interrupts, at contacts 232, a multiple circuit, including the contacts 243 and 291 for energizing the lower winding of the changeover relay 290 and the vertical magnet. The changeover relay 290 being of the slow-to-release type remains operated during the digit; and the vertical magnet is operated a number of times corresponding to the number of impulses of the digit dialed at the calling subscribers substation S1. When the wiper carriage of the Strowger mechanism (not shown) is driven away from its home position, the sets of switch springs V. O. N. are actuated to place direct ground potential on and operate relay 280. Upon operation, relay 280 interrupts contacts 281, the previously traced circuit for energizing the upper winding of relay 290; however, the later relay is maintained in its operated position at this time, by virtue of the intermittent completion of the previously traced circuit for energizing the lower winding thereof, and the changeover relay 290 is of the slow-to-release type.

At the conclusion of the digit, the line relay 230 is maintained in its operated position in order to maintain operated the hold relay 240, and the changeover relay restores shortly thereafter. The wipers now stand opposite a group or level of contacts dependent on the digit dialed. Upon restoring, the changeover relay 290 completes at contacts 292, the operating circuit for the rotary magnet via contacts 254, 212, 229, 268, 285, and 292 through the winding of the rotary magnet to battery. Upon operating, the rotary magnet interrupts a point, at its interrupting spring INT, of the last traced operating circuit therefor; whereby the rotary magnet operates buzzer fashion in order to drive the wiper carriage of the Strowger mechanism step by step in the rotary direction.

When the wiper carriage of the Strowger mechanism (not shown) is driven one step in the rotary direction, the first trunk in the previously selected group (not shown), is tested. Battery potential appears upon the outgoing conductor C in the event that the trunk mentioned is idle; conversely, the ground potential appears upon the outgoing conductor C in the event the trunk mentioned is busy. The presence of ground potential on the outgoing conductor C of the tested trunk completes a path for short-circuiting the winding of the test relay 210; whereas the application of the battery potential to the control conductor of the trunk mentioned completes an identical circuit for energizing the winding of the test relay 210, thereby to cause the later relay to be operated. Accordingly, the rotary magnet effects automatic operation of the Strowger mechanism in the rotary direction until an idle trunk is selected in conformity with the conventional practice, whereupon the test relay 210 operates. Upon operating, the test relay 210 interrupts at the contacts 212, the previously traced circuit for operating the rotary magnet; whereby the rotary magnet restores and further operation of the rotary magnet is positively prevented. Also, upon operating, the test relay 210 completes, at the contacts 211, an obvious circuit for operating the switch-through relay 220, whereby the later relay interrupts, at the contacts 221 and 223, the previously traced loop circuit extending between the talking conductors and the upper and lower windings of the line relay 230, causing the later relay to restore. Also, upon operating, the switch-through relay 220 completes, at contacts 222 and 224, a further loop circuit extending from the preceding switch to the succeeding switch, whereupon ground potential in the succeeding switch is returned over the outgoing conductor C in order to complete an alternative holding circuit, including the contacts 261, 226, 227 for maintaining the switch through relay 220 operated. Relay 230, upon restoring, opens the circuits to relay 240, which in turn, opens the circuit to relay 250.

In view of the foregoing description, it can be readily seen that in the event that the subscriber at substation S1 makes a local call to a level where the normal post springs N. P. S. are not operated, relays 210, 220, 230, 240, 250, 280, and 290 will operate in the manner as described. Relay 260, at this time, can not operate because the normal post springs are not operated and relay 270 can not operate unless relay 260 has first operated.

It should be noted that, according to the invention, the Strowger mechanism comprises a set of normal post springs N. P. S. which are selectively actuated in response to predetermined operation of the wiper shaft in the vertical direction. More particularly, when the wiper carriage of the Strowger mechanism is operated ten steps in the vertical direction, for example, to select a group of toll trunks, the normal post springs N. P. S. are actuated. Assuming the subscriber at substation S1 dials the digit 0 after having seized the selector STS to bring about operation of the selector 200 in a manner substantially identical to that as previously explained, the wiper carriage of the Strowger mechanism is operated ten steps in the vertical direction to select the group of trunks. Assuming all the trunks of this selected group are found busy, the testing wipers will rotate off the bank and operate the cam springs CAM which will cause relay 250 to be released. Since relay 240 is still operated on account of its slow characteristics, the restoration of relay 250 will operate relay 260 over the following path: ground on contacts 242, contacts 256, normal post springs N. P. S., contacts 287, through the winding of relay 260 to battery. Relay 260, upon operation, will close contacts 265 and lock itself to the operating ground on contacts 242.

Ordinarily, in the event of all trunks being found busy, a busy tone will be returned to the calling line via contacts 251 upon the restoration of relay 250. As already described, this invention has provided more groups of trunks than that can be accommodated in the predetermined regular level or levels, it is therefore necessary to withhold the busy tone so that the calling party will not hang up and sufficient time would be given to the selector switch to hunt for an idle line on the normal level. Relay 260, in opening contacts 263, will serve this purpose by disconnecting the busy tone. Upon operation, relay 260 closes the release magnet circuit over the following path: ground on contacts 228, contacts 276, contacts 269, contacts 284, through the winding of the release magnet RLSE to battery. The shaft now starts to release and closes the cam springs CAM with the result that relay 250 is operated again. Relay 260 remains locked operated and, in opening contacts 268, prevents the automatic rotation by interrupting the rotary magnet circuit. As the shaft drops back to the normal level NL, the vertical-off-normal springs V. O. N. are opened, and cause relay 280 to be restored immediately. Relay 280, upon restoring, completes a circuit to operate relay 270 over the following path: ground on contacts 242, 255, 269, 286 through the upper winding of relay 270 to battery. Relay 270, upon operation, locks itself to the operating ground at contacts 267 via contacts 274; and in closing contacts 273, completes an obvious circuit to relay 280. The operation of relay 270 is necessary because it reoperates relay 280 before the rotary-off-normal springs R. O. N. close, and opens the release magnet circuit at 276. The operation of relay 280 is necessary since it must operate to close the rotary magnet circuit at contacts 285. Furthermore, relay 290 can not operate when relay 280 releases because its circuit is opened at contacts 262 by the operation of relay 260. Since relay 290 can not operate, it is impossible for the subscriber at substation S1 to operate the vertical magnet by hanging up the handset or dialing the digits after the shaft has released from the toll level.

The rotation of testing wiper over the normal level is in the same manner as it is described with respect to the other regular levels with the exception that the outgoing conductor C is, at this time, connected to the winding of the testing relay 210 through contacts 271. In case an idle trunk is found, relay 210 operates and causes relay 220 to operate, and relay 220 restores relays 230, 240, and 250 in the well known manner. Relay 270 should not release until relay 260 has released and this is necessary because relay 270, upon operation, has closed the outgoing conductor to relay 210 via contacts 271. However, relay 260, upon restoring, will have the contacts 261 closed before contacts 271 are opened. Relay 280 is held operated by the rotary-off-normal springs after relay 260 causes relay 270 to be restored.

Assuming one of the desired toll trunks is idle, the trunk circuit TC3 operates to close the trunk extending to the operator switchboard O. S. B. in order to indicate to the operator thereat that a call is on the trunk waiting to be answered. When the operator at the switchboard O. S. B. answers the call, the operator may undertake the extension of the connection to the desired called service, and the telephone connection is therefore completed via the normal level.

Assuming all the trunks in the normal level are found busy, the shaft will rotate off the normal level and cause the cam springs CAM to be opened for releasing relay 250. Relay 250, upon restoring, can not operate relays 260 and 270 as previously described as they have already been operated, and besides, the normal post springs, N. P. S. are not closed. Its restoration, however, will connect the busy tone to the calling line via contacts 282, 251, 272, 225, and 223. This is made possible because relay 270, upon operation, has closed contacts 272. The subscriber at substation S1 will then hang up his handset and cause the line relay 230 to be restored. Relay 230, in turn, will restore relays 240, 250, and 260 in the order as previously described, and it will also close the release magnet circuit over the following path: ground at contacts 228, contacts 232, contacts 244, contacts 284 through the winding of the release magnet to battery. This makes it possible that the release magnet circuit is closed before relays 250, 260, and 270 have restored. The shaft may then start to release before relay 270 restores. The rotary off-normal springs R. O. N. will cause relay 280 to be restored after the shaft restores.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A numerical switch of the trunk-hunting type having a plurality of wipers and levels of bank contacts engaged thereby, said wipers being movable in a primary and a secondary direction and said contact levels including off-normal levels and a normal level such that said wipers when in one of their primary-off-normal positions rest adjacent one of said off-normal levels and when in their primary-normal position rest adjacent the normal level, sets of trunks connected to the bank contacts of said off-normal levels and a set of trunks connected to the bank contacts of said normal level, means responsive to numerical impulses received by said switch for selectively advancing said wipers to a position opposite a desired one of said first mentioned sets of trunks and means operative in case all of said trunks of said selected set are busy for releasing said wipers to their primary-normal position and then causing them to be automatically advanced in said secondary direction in search of an idle one in said second mentioned set of trunks.

2. A numerical switch of the trunk-hunting type having a plurality of wipers and levels of bank contacts engaged thereby, said wipers being movable in a vertical and a rotary direction and said contact levels comprising off-normal levels and a normal level such that said wipers when in one of their vertical-off-normal positions, rest adjacent one of the off-normal levels and when in their vertical-normal positions rest adjacent the normal level, a set of trunks connected to the bank contacts of said off-normal levels, and a set of trunks connected to bank contacts of said normal level, means responsive to numerical impulses received by said switch for selectively raising said wipers to a position opposite a desired one of said first-mentioned sets of trunks and means operative in case all of said trunks of said set are busy for dropping said wipers back to their vertical-normal position opposite said normal level and then causing them to be automatically advanced in said rotary direction in search of an idle one in said second-mentioned set of trunks.

3. In an automatic telephone system, a calling line and a numerical switch of the trunk-hunting type having a plurality of wipers and levels of bank contacts engaged thereby, said wipers being movable in a primary and a secondary direction and said contact levels including off-normal levels and a normal level such that said wipers when in one of their primary-off-normal positions rest adjacent one of the off-normal levels, and when in their primary-normal position rest adjacent the normal level, sets of trunks connected to the bank contacts of said off-normal levels and a set of trunks connected to the bank contacts of said normal level, means responsive to numerical impulses received by said switch under the control of said calling line for selectively advancing said wipers to a position opposite a desired one of said first-mentioned sets of trunks, a busy signal and means operative in case all of said trunks are busy for preventing said signal from being returned to said calling line and for releasing said wipers to their primary-normal position and then causing them to be automatically advanced in said secondary direction in search of an idle one in said second-mentioned set of trunks.

4. In an automatic telephone system, a calling line and a numerical switch of the trunk-hunting type having a plurality of wipers and levels of bank contacts engaged thereby, said wipers being movable in a primary and a secondary direction and said contact levels including off-normal levels and a normal level such that said wipers when in one of their primary-off-normal positions rest adjacent one of the off-normal levels, and when in their primary-normal position rest adjacent the normal level, sets of trunks connected to the bank contacts of said off-normal levels and a set of trunks connected to the bank contacts of said normal level, means responsive to numerical impulses received by said switch under the control of said calling line for selectively advancing said wipers in said primary direction to a primary-off-normal position adjacent a desired one of said first mentioned sets of trunks, contact means actuated in a predetermined one of said primary-off-normal positions and means operated dependent on the condition of said contact means in case all trunks in said desired level are busy for releasing said wipers to their primary-normal position and then causing them to be automatically advanced in said secondary direction in search of an idle one in said second mentioned set of trunks.

5. In an automatic telephone system, a calling line and a numerical switch of the trunk-hunting type having a plurality of wipers and levels of bank contacts engaged thereby, said wipers being movable in a primary and a secondary direction and said contact levels including off-normal levels and a normal level such that said wipers when in one of their primary-off-normal positions rest adjacent one of the off-normal levels and when in their primary-normal position rest adjacent the normal level, sets of trunks connected to the bank contacts of said off-normal levels and a set of trunks connected to the bank contacts of said normal level, means responsive to numerical impulses received by said switch under the control of said calling line for selectively advancing said wipers in said primary direction to a primary-off-normal position adjacent a desired level of said off-normal bank contacts, means thereafter operative for automatically advancing said wiper over the contacts corresponding to said desired set in search of an idle trunk, said means being operative in the event that all trunks in said set are busy for automatically advancing said wipers into an overflow position, a busy signal, control means normally operative in said overflow position for closing a circuit over which said signal is returned to said calling line, contact means actuated in a pre-determined one of said primary-off-normal positions and means operative dependent on the condition of said contact means in case said wipers have been advanced into said overflow position for preventing said busy signal circuit from being closed by said control means and for releasing said wipers to their primary-normal position and then causing them to be automatically advanced in said secondary direction in search of an idle one of said second mentioned set of trunks.

6. In an automatic telephone system, the combination as claimed in claim 5 and further including means operative after said wipers have reached said primary-normal position for enabling said control means to close said busy signal circuit in said overflow position in case all trunks in said second-mentioned set of trunks have been found busy.

7. An automatic switch having vertical and rotary movement for use in a telephone system, and having a plurality of wipers with levels of bank contacts accessible thereto, said wipers having a normal vertical position and a plurality of off normal vertical positions, one level of contacts accessible to the wipers in the normal vertical position and having a plurality of trunks connected thereto and the other levels of bank contacts accessible to the wipers from different off normal vertical positions and having a plurality of trunks connected to each level thereof, means in the switch responsive to received impulses corresponding to certain digits for raising the wipers to one of its off normal vertical positions and for causing the switch to test for an idle trunk of those connected to that level and return a busy signal in case all are busy, and means associated with a certain one of said levels and operated only when the switch is operated to that level, for releasing the switch to bring the wipers opposite the normal level, and automatically causing the wipers to be rotated over the bank contacts in said normal level in search of an idle trunk connected thereto.

8. In a telephone system an automatic switch having wipers with a plurality of vertical off-normal levels and a normal level of bank contacts and a plurality of groups of trunks accessible thereto through said off-normal levels and said normal level and means for operating said switch to move the wipers to any one of said off-normal levels and said different groups therein and cause the wipers to test for an idle trunk in the selected group and return a busy signal in case all of the trunks in that group are busy, together with means operated only in case the wipers are operated to an off-normal level and to a particular group of trunks therein, for automatically causing said wipers to be released from said off-normal level and moved adjacent to said normal level of bank contacts including another group of trunks in case all of the trunks in said particular group are busy, and select an idle trunk in said other group.

References Cited in the file of this patent

UNITED STATES PATENTS

| | | |
|---|---|---|
| 1,812,999 | Taylor et al. | July 7, 1931 |
| 1,886,613 | Wicks | Nov. 8, 1932 |
| 2,172,947 | Taylor et al. | Sept. 12, 1939 |
| 2,658,109 | Kessler | Nov. 3, 1953 |
| 2,658,949 | Pharis | Nov. 10, 1953 |
| 2,660,619 | Kessler | Nov. 24, 1953 |